3,443,995
BATTERY CONSTRUCTION
Vincent Michael Halsall, Bayside, and Roy Erving Hennen, Mequon, Wis., assignors to Globe-Union Inc., Milwaukee, Wis., a corporation of Delaware
Filed Oct. 13, 1966, Ser. No. 586,400
Int. Cl. H01m 39/02, 35/32
U.S. Cl. 136—79                4 Claims

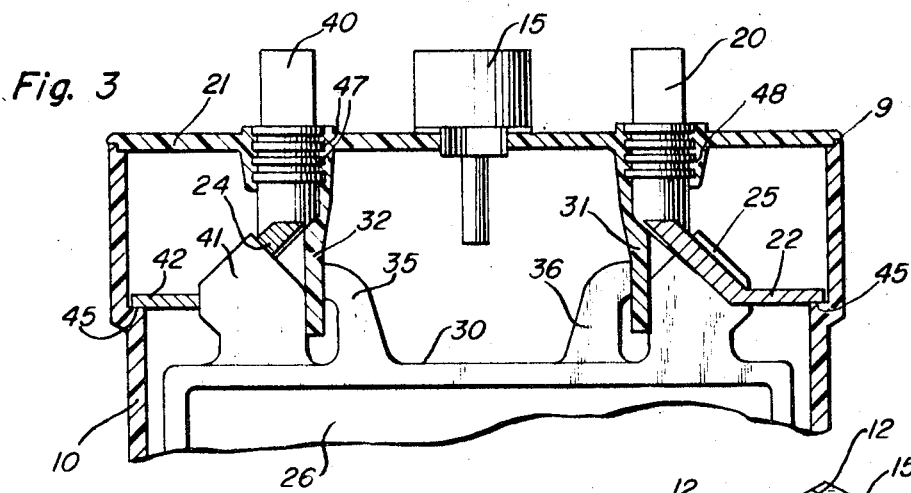
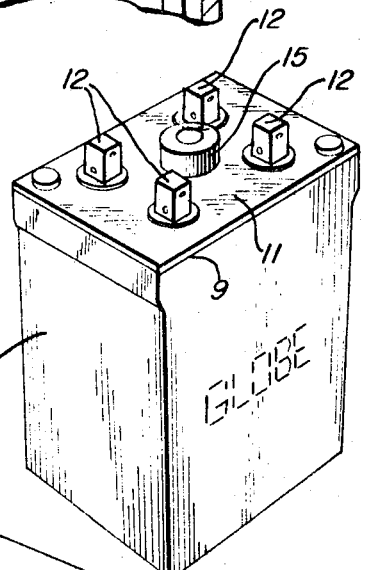
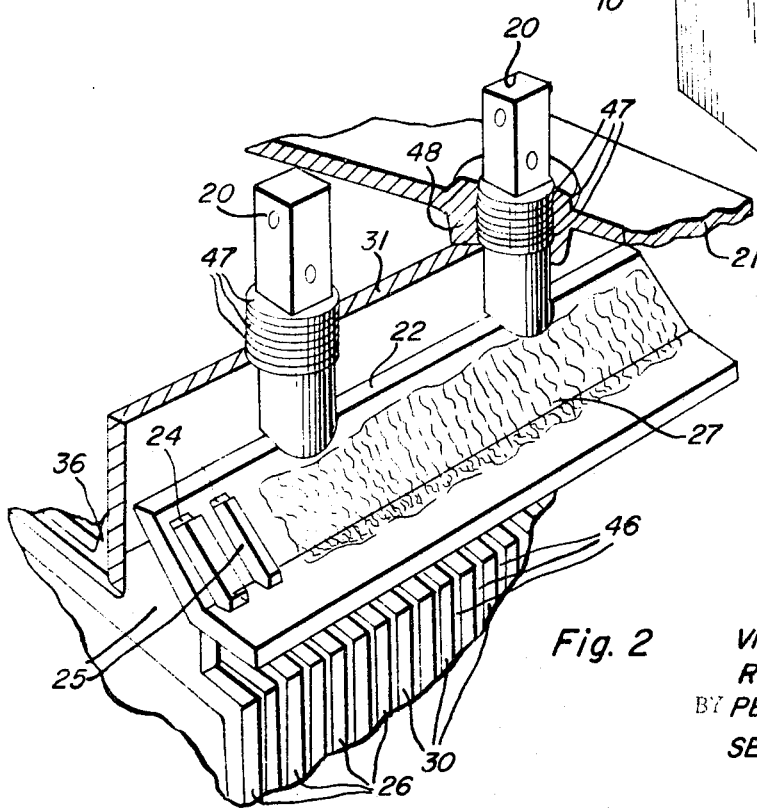
INVENTORS
VINCENT M. HALSALL
ROY E. HENNEN
BY PENDLETON, NEUMAN
SEIBOLD & WILLIAMS
ATTORNEYS United States Patent Office 3,443,995
Patented May 13, 1969

ABSTRACT OF THE DISCLOSURE

A plate suspending structure for a storage battery is described in detail. Both the positive and negative plates of the battery have two projections extending from their upper portions, one projection near the corner of the plate and the other projection spaced from the corner and in proximity to the corner projection of the opposite polarity plate. The projections at the corners are mechanically and electrically connected to two conducting posts mounted in the cover. Two nonconducting rib members project vertically from the battery cover. One rib member fits between the corner projections on the positive plates and the spaced projections on the negative plates; the other rib member fits between all the corner projections on the negative plates and the spaced projections on the positive plates. Two ledges in the battery container support two conductive straps which connect the positive and negative plates, respectively. With this construction, torsion at the corner projections is prevented. In addition, this construction allows for changes in size of the plates.

---

This invention relates to batteries and particularly to a novel construction for supporting plates in a stationary battery.

The class of electric storage batteries generally termed "stationary batteries" includes various sizes and types especially designed for nonautomotive uses. In particular, such batteries are designed as standby or auxiliary power sources and thus should be capable of accepting a relatively continuous, slow charge and to hold a charge well when standing idle.

It has been observed that the plates, and particularly the positive plates of stationary lead-acid batteries, have a tendency to grow over a long period of time under the conditions described above. Such growth has produced damage to the cell structure, as conventional mounting techniques with the plates resting on ribs or other supports produces buckling and distortion in the plates and/or damaging forces on the case and cover structures. Electrical shorts or mechanical failure of cell components can result from such distortion and the storage battery is thereby rendered useless.

To overcome these problems in manufacturing stationary lead-acid storage batteries it has been proposed to hang the battery plates from straps attached to terminal post members secured to the battery cover. Thereby growth may be tolerated without significant buckling or distortion. Because the positive and negative terminal posts of stationary batteries are physically and electrically separated in the cover, the respective positive and negative plates are supported only at one upper corner. It has been found that such construction is accompanied by undesirable strain at the terminal post-cover seal tending to increase the possibility of acid leakage. Also, this supporting technique renders the battery susceptible to damage from shock and vibration as well as plate scissoring which leads to eventual plate failure.

It is, therefore, an object of the present invention to provide a novel stationary battery construction.

It is a further object of the present invention to provide a novel interlocking supporting structure for the plates of a stationary battery.

It is a further object of the present invention to provide a reliable technique for hanging plates in a stationary battery.

It is a further object of the present invention to provide a novel cover for stationary batteries.

It is a further object of the present invention to provide a novel plate structure for use in stationary batteries.

In the present invention, battery plates of similar polarity are mechanically connected through lugs at one of their upper corners to hang from a metal conducting strap. The battery case supports the metal strap which is electrically and mechanically connected to a terminal post, or posts, on the side of the battery cover.

Each plate is provided with an auxiliary lug which establishes an interlocking support connection with the lug structure of the opposite polarity plates through a nonconducting support member integral with the cover. The two sets of plates are hung in a statically balanced relationship which minimizes the stress moments within the structure. This prevents undesirable strain at the lugs and provides a rigid support for the plates which lessens the possibilities of damage due to shock or vibration.

A more detailed description of the present invention will be given with reference to the accompanying drawing in which:

FIG. 1 is an isometric drawing of a stationary battery;

FIG. 2 is an isometric view partially in section showing certain features of the present invention; and FIG. 3 is a side view partially in section showing certain features of the present invention.

Stationary batteries, such as that shown in FIG. 1, are used primarily for standby high power storage purposes. The battery includes an electrolyte container 10, which may be made of any suitable material, e.g., rubber, glass, or a thermoplastic, and a cover portion 11 sealed to the container 10 with a compound 9 or by thermal fusion. Four terminal post members 12 are mounted in the cover portion 11. Two of the terminal posts are positive and two are negative. It is a usual practice to provide four terminal posts on larger cell sizes due to the high current drain potentially experienced by the battery. It should be noted that the present invention may be incorporated in batteries having any number of terminal posts. A gas vent and acid filling closure 15 is mounted in the cover 11 and may be of a conventional or explosion-proof type.

FIGS. 2 and 3 illustrate one embodiment of a stationary battery plate supporting structure constructed according to the present invention. In FIG. 2 two negative terminal post members 20 are shown mounted in the cover portion 21 of the battery. The posts 20 may be molded into the cover while it is being formed or may be welded or molded in metal bushings or sealed therein with appropriate compound or cement. While two terminal posts 20 are shown, it should be noted that any number may be used.

In the described embodiment the posts 20 have sealing vanes 47 formed thereon and the cover 21 is of a molded construction with vertically extending bosses 48 formed therein, surrounding the posts 20 and forming a seal with the vanes 47.

A strap 22 of conducting material is mechanically connected to the posts 20. The strap 22 is preferably made of the same material as the terminal post members 20, generally a lead based alloy and may be cast integrally therewith. The strap 22 contains a plurality of slots 24 for receiving supporting lugs 25 from each of the negative plates 26 of the battery. The lugs 25 are burned into the strap 22. The process of "burning" is a common one in the battery making art where a hot torch or the like is applied to two contiguous lead members whereby the lead flows together to form a bond.

The plates are of conventional construction including a matrix or grid filled with a paste of active material. The grid imparts substantial rigidity to the plate and has the supporting lugs integrally formed therewith.

In the process of connecting the lugs 25 of the negative plates 26 to the conducting strap 22, all the plates, positive and negative, are stacked with separators 46 therebetween, the lugs 25 are placed in their respective slots 24, and the portions of the lugs extending through the strap 22 are burned into the strap. The resulting construction is illustrated at one portion 27 of the strap 22 in FIG. 2. A similar construction is employed with the positive plates 30 of the battery. These are burned onto a second strap which in turn is connected to the other two terminal posts.

As best shown in FIG. 3, nonconducting rib members 31, 32 extend from the cover 21 to a point just above the plates 26, 30. The ribs 31, 32 are preferably formed integrally with the cover portion 21 and form part of a rigid mechanical connection with the battery plates.

A negative plate 26 has, in addition to the lug 25 which is burned into the conducting strap 22, an auxiliary lug 35 at the opposite side of the plate. The positive plate 30, immediately behind the negative plate 26, has a corresponding auxiliary lug 36.

The two nonconducting ribs 31, 32 extend into the battery from the battery cover 21 in the vicinity of the terminal posts 20, 40, respectively. The rib 31 is entrapped between the lugs 25 of the negative plates and the auxiliary lugs 36 of the positive plates while the rib 32 is entrapped between the lugs 41 of the positive plates and the auxiliary lugs 35 of the negative plates. Thus the rib 31 in the vicinity of the negative terminal post 20 fits between the burned lug 25 of the negative plate 26 and the auxiliary lug 36 of the positive plate 30. Similarly, the strap 32, in the vicinity of the positive terminal post 40 fits between the negative plate auxiliary lug 35 and the positive plate burned lug 41. Both straps 31, 32 extend along the entire length of the battery and contact the lugs on all of the plates.

The two conducting straps 22, 42 rest on ledge members 45 formed in the upper part of the container 10. When the plates and supporting structures, including the conducting straps 22, 42, the terminal posts 20, 40 and the cover 21, are placed into the container 10, the support structure becomes rigid and the plates are firmly held in the container.

The rigidity of the supporting structure can best be appreciated by considering the interaction of the forces acting on the plates. In a prior stationary battery supporting arrangement the weight of the plates causes a significant torque at the corner supporting lugs. This torque establishes torsional strain at both the lug and the strap connecting the lug to the terminal post member. In the present construction, on the other hand, two additional forces act on each plate to reduce this strain. Thus, the additional forces acting on the negative plate 26 are the force acting on the auxiliary lug 35 and the force exerted by the auxiliary lug 36. The elimination of the torque at the support lug provides a much more reliable structure.

While a single embodiment of this invention has been described in detail, further modifications may be made thereto and it is contemplated, therefore, by the appended claims, to cover any such modifications as fall within the true spirit and scope of this invention.

What is claimed is:

1. A battery comprising a container and plate means suspended in said container, said container including a cover and a body, positive and negative terminal means secured in said cover, said cover having a pair of nonconducting ribs extending downwardly therefrom into said body and one rib positioned in the vicinity of the positive terminal means and the other rib positioned in the vicinity of the negative terminal means, said plate means comprising a plurality of alternate positive and negative plates, each of said plates having first and second lugs on their upper portions, the first lugs of similar polarity plates being connected to one of said terminal means and the second lugs of said similar polarity plates engaging the opposed rib which is in the vicinity of the other terminal means whereby a stable balanced assembly is produced.

2. The battery of claim 1 wherein said plate means comprises a plurality of alternate positive and negative plates having separators therebetween, each of said positive plates being secured to said container adjacent one of the upper corners thereof and each of said negative plates being secured to said container adjacent the opposite upper corners thereof.

3. The battery of claim 1 wherein a conductive strap forms a part of said positive terminal means and is supported by said container and said positive and negative plates have lugs formed thereon adjacent said upper corner, said lugs being secured to the respective positive and negative straps.

4. A battery compirsing a container and plate means suspended in said container, said container including a cover and body having two sides which define generally parallel opposed internal ledges, positive and negative terminal means, each adjacent respectively one of said sides and secured in said cover, two conductive straps each mechanically and electrically connected to one of said terminal means, each strap connected to terminal means of different polarity and resting on the associated one of said ledges, said straps having a plurality of longitudinally spaced apertures therein, said cover having a pair of nonconducting ribs extending downwardly therefrom into said body between said straps, one rib positioned in the vicinity of the positive terminal means, and the other rib positioned in the vicinity of the negative terminal means, said plate means comprising a plurality of alternate positive and negative plates having separators therebetween, each of said plates having a first lug adjacent one upper corner and a second lug adjacent the opposite upper corner, the first lugs of similar polarity plates being secured in the apertures of the respective strap, and the second lugs of said similar polarity plates engaging the opposed rib which is in the vicinity of the other terminal means and urging said rib against the first lugs of the opposite polarity plates whereby a stable, balanced assembly is produced.

References Cited

UNITED STATES PATENTS

| | | | |
|---|---|---|---|
| 2,199,229 | 4/1940 | Smith | 136—80 |
| 2,261,109 | 11/1941 | Dunzweiler | 136—134 |
| 2,324,185 | 7/1943 | Ambruster | 136—80 |
| 2,637,758 | 5/1953 | Shannon | 136—134 |
| 2,774,805 | 12/1956 | Harrison et al. | 136—79 |
| 3,242,012 | 3/1966 | Sabatino | 136—134 |

A. B. CURTIS, *Primary Examiner.*

C. F. LE FEVOUR, *Assistant Examiner.*

U.S. Cl. X.R.

136—134